2,940,933
MINERAL OIL ANTIOXIDANT

James L. Jezl, Swarthmore, Pa., assignor to Sun Oil Company, Philadelphia, Pa., a corporation of New Jersey No Drawing. Filed Sept. 26, 1956, Ser. No. 612,114

5 Claims. (Cl. 252—47.5)

This invention relates to improving the oxidation stability of mineral oil by the addition thereto of methionine, methionine anhydride, or organic derivatives thereof.

In accordance with this invention, methionine, methionine anhydride, or organic derivatives thereof, as hereinafter described, are incorporated in mineral oil in small but sufficient amount to improve the oxidation stability of the oil. Normally, amounts of the novel additives of this invention in the range of about 0.01% to 2% by weight of the stabilized mixture, and preferably about 0.05% to 1% give good results. Amounts outside this range can, however, be used.

The invention is useful in enhancing the oxidation characteristics of various petroleum fractions such as gasoline, kerosene, diesel fuel, jet fuel and viscous distillate lubricant fractions. Mineral oil stabilized according to this invention can contain other additives which are commonly employed in such fractions. For example, gasoline fractions can contain antiknock agents such as tetraethyl lead in addition to the additives of the instant invention. Lubricant fractions treated by the invention can contain extreme pressure agents, detergents, and other additives.

Compounds which are added to mineral oil in accordance with this invention to stabilize the oil against oxidation are methionine, methionine anhydride, and soluble organic derivatives thereof. These compounds have the general formulas:

(1)
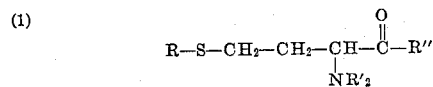

(2)
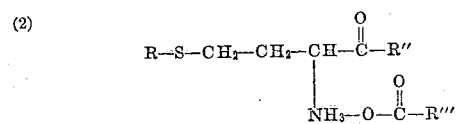

and (3)
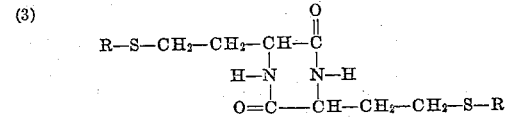

where R is a hydrocarbon group, R' is H, hydrocarbon or

R'' is —OH, —ONHR$_3$ or —NR$_2$, and R''' is hydrogen or a hydrocarbon group. Methionine

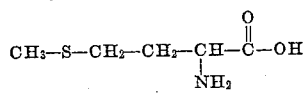

and methionine anhydride

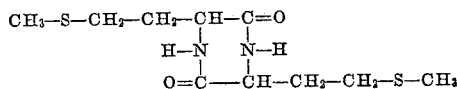

can be used in carrying out the invention. Methionine anhydride is a 2,5-diketopiperazine and could be called 3,6(di - β - methylmercaptoethyl) - 2,5-diketopiperazine. Since these compounds have low solubilities in mineral oil, it may be desirable in some cases to employ organic derivatives of methionine or methionine anhydride which have greater oil solubility. However, the presence of methionine or methionine anhydride in a mineral oil composition will effectively improve the oxidation stability in spite of their low solubilities.

Organic methionine derivatives which can be used in practicing the invention have the formula:

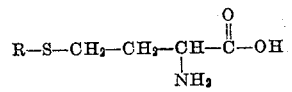

where R is a hydrocarbon group. R can be an alkyl, cycloalkyl, alkaryl, aryl, or aralkyl group, generally having from one to thirty atoms although larger hydrocarbon groups can be used. Examples of suitable hydrocarbon groups are ethyl, butyl, phenyl, tolyl, benzyl, hexyl, octyl, decyl, dodecyl, naphthenyl and the like. These methionine derivatives can be prepared in a manner analogous to the known preparation of methionine by a series of reactions as follows:

$$RSH + CH_2=CHCHO \longrightarrow RSCH_2CH_2CHO$$

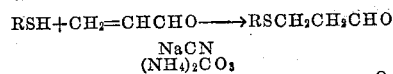

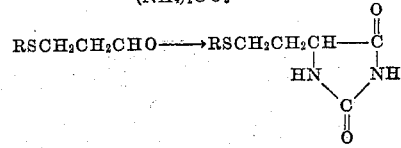

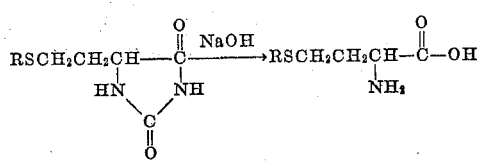

See Fieser and Fieser, "Organic Chemistry," 3rd Ed., page 432, (1956). A specific example of this type of compound which can be used in this invention is:

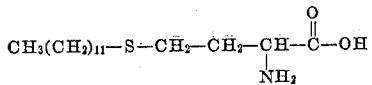

Anhydrides of these methionine derivatives can be prepared in ways analogous to the conventional methods by which methionine anhydride is prepared and these anhydrides can be used in practicing the invention.

Other oil-soluble organic derivatives which are useful in the invention are formed by reacting methionine or its derivatives with organic acids to form salts having the formula:

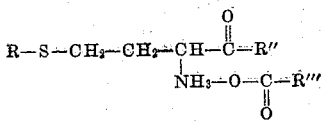

or amides having the formula:

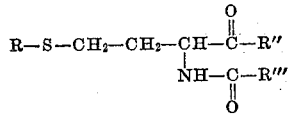

where R is a hydrocarbon group as above described, R'' is —OH, —ONHR$_3$ or —NR$_2$, and R''' is hydrogen or a hydrocarbon group. The salts designated by the formula above can be formed by reacting methionine or a derivative thereof with an organic acid at relatively mild conditions, i.e., temperatures below about 250° F. The amides can be formed by reacting the same components at more severe conditions, i.e., about 400° F. or higher. Examples of suitable organic acids which can be reacted with methionine to form the above-type compounds are petroleum naphthenic acids, the fatty acids such as caproic, capric, lauric, myristic, palmitic, stearic, oleic and ricinoleic acids, aromatic carboxylic acid such as benzoic, toluic and salicylic acids, and resin acids.

Specific examples of salts and amides of this type which are used in the invention are:

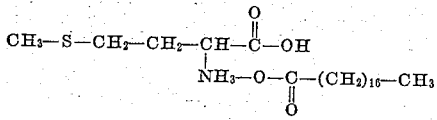

and

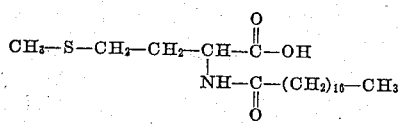

Still other organic derivatives of methionine which are useful in the invention are formed by reacting methionine or its derivatives with organic amines to form salts having the formula:

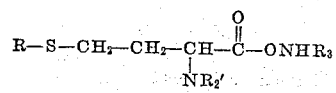

or

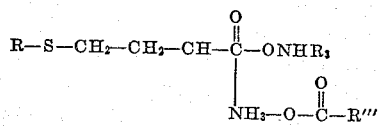

or amides having the formula:

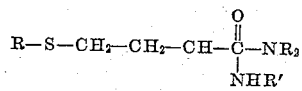

or

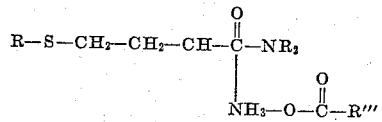

where R is a hydrocarbon group as above described, R' is hydrogen, hydrocarbon or

and R''' is hydrogen or a hydrocarbon group. These salts are formed by reacting methionine or derivatives thereof with an amine at relatively mild conditions, i.e., about 250° F. or lower, while the amides are formed at more severe conditions, i.e., about 400° F. or higher. Examples of suitable amines which are reacted with methionine to form the above compounds are ethyl amine, trimethyl amine, decylamine, aniline and the like. Specific examples of salts and amides of this type which are used in the invention are:

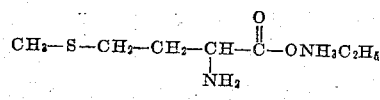

and

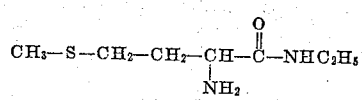

The following examples illustrate the invention:

Additives of this invention were incorporated in separate samples of a naphthenic type distillate lubricating oil which had viscosity of about 500 SUS at 100° F. The oxidation stabilities of these samples as well as samples of the oil containing no additive and containing a well known oxidation stabilizer were obtained. The stabilities were determined by observing the induction period of the oils at 280° F., i.e., the time elapsing while the oils were in contact with an oxidizing medium at that temperature before a predetermined small amount of oxidation of the oil sample occurred. The following table shows the results obtained:

Table I

| Additive | Amount of Additive in the Sample, Percent by Wt. | Oxidation Stability, Hrs. |
| --- | --- | --- |
| None | | 6.1 |
| dl-methionine | 0.1 | 26.0 |
| dl-methionine | 0.2 | 45.0 |
| dl-methionine anhydride | 0.1 | 31.0 |
| d-methionine | 0.1 | 20.0 |
| l-methionine | 0.1 | 7.0 |
| di-tert-butyl-p-cresol | 0.1 | 10.4 |

These results show that methionine and methionine anhydride are effective stabilizers of oil against oxidation. At similar additive concentrations, dl-methionine anhydride was most effective in improving oil stability. The dl-methionine mixture synergistically improved the stability of the oil as compared to the effect of the separate isomers. The results show that, with the exception of l-methionine, the additives of this invention are far superior to di-tert-butyl-p-cresol which is widely used commercially as an oxidation inhibitor for oil.

I claim:

1. A stabilized mineral oil composition comprising a major proportion of mineral oil and a small but sufficient amount to improve oil oxidation stability of a compound selected from the group consisting of dl-methionine, dl-methionine anhydride and d-methionine.

2. Composition according to claim 1 wherein said compound is present in amount of 0.01% to 2.0% by weight.

3. Composition according to claim 1 wherein said compound is dl-methionine anhydride and the dl-methionine anhydride is present in amount of 0.1% by weight.

4. Composition according to claim 1 wherein said compound is dl-methionine and the dl-methionine is present in an amount of 0.1% to 0.2% by weight.

5. Composition according to claim 1 wherein said compound is d-methionine and the d-methionine is present in amount of 0.1% by weight.

References Cited in the file of this patent

UNITED STATES PATENTS

| 2,270,113 | Clayton et al. | Jan. 13, 1942 |
| 2,349,749 | Paul | May 23, 1944 |
| 2,352,950 | Gates | July 4, 1944 |
| 2,416,052 | Gribbins et al. | Feb. 18, 1947 |
| 2,523,127 | Lundberg | Sept. 19, 1950 |

OTHER REFERENCES

"Study of the Antioxidant Effectiveness of Several Compounds on Vegetable Fats and Oils," K. F. Mattil, L. J. Filer Jr., Oil and Soap Journal, vol. 21 (1944), pages 160 and 161, New York.